(12) United States Patent
Radusewicz et al.

(10) Patent No.: US 6,876,103 B2
(45) Date of Patent: Apr. 5, 2005

(54) AUTOMATIC TRANSFER SWITCH SYSTEMS AND CONTROLLERS

(75) Inventors: Peter J. Radusewicz, West Newton, IL (US); Walter Paul Payack, Jr., Suwanee, GA (US); Carl Kyrk, Lisle, IL (US)

(73) Assignee: General Electric Company, Schenectady, NY (US)

( * ) Notice: Subject to any disclaimer, the term of this patent is extended or adjusted under 35 U.S.C. 154(b) by 172 days.

(21) Appl. No.: 09/751,868

(22) Filed: Dec. 29, 2000

(65) Prior Publication Data

US 2002/0084697 A1 Jul. 4, 2002

(51) Int. Cl.$^7$ .......................... H02J 7/00; H01H 83/00
(52) U.S. Cl. ................... 307/64; 307/125; 307/129; 307/130
(58) Field of Search .................. 307/39, 64, 66, 307/87, 141, 125, 129, 130

(56) References Cited

U.S. PATENT DOCUMENTS

| | | |
|---|---|---|
| 3,936,782 A | 2/1976 | Moakler et al. |
| 4,021,678 A | 5/1977 | Moakler et al. |
| 4,157,461 A | 6/1979 | Wiktor |
| 4,189,649 A | 2/1980 | Przywozny et al. |
| 4,226,581 A * | 10/1980 | Schilling ................ 431/26 |
| 4,384,213 A * | 5/1983 | Bogel .................... 307/64 |
| 4,398,097 A | 8/1983 | Schell et al. |
| 4,423,336 A | 12/1983 | Iverson et al. |
| 4,593,213 A * | 6/1986 | Vesce et al. ............. 327/310 |
| 4,672,227 A | 6/1987 | Lagree et al. |
| 4,747,061 A | 5/1988 | Lagree et al. |
| 4,804,933 A | 2/1989 | Becker et al. |
| 4,894,796 A | 1/1990 | Engel et al. |
| 5,070,252 A | 12/1991 | Castenschiold et al. |
| 5,497,332 A * | 3/1996 | Allen et al. ............. 700/295 |
| 5,680,324 A * | 10/1997 | Schweitzer et al. ...... 370/241 |
| 5,703,748 A * | 12/1997 | Fulks et al. ............. 361/153 |
| 5,739,594 A * | 4/1998 | Sheppard et al. ........ 307/64 |
| 5,748,432 A | 5/1998 | Przywozny et al. |
| 5,814,467 A | 9/1998 | Jonas et al. |
| 5,920,129 A * | 7/1999 | Smith .................... 307/64 |
| 5,939,799 A | 8/1999 | Weinstein |
| 6,100,604 A | 8/2000 | Morroni et al. |
| 6,172,432 B1 | 1/2001 | Schnackenberg et al. |
| 6,181,028 B1 * | 1/2001 | Kern et al. .............. 307/64 |
| 6,196,012 B1 * | 3/2001 | Reason et al. ........... 62/196.2 |
| 6,288,640 B1 * | 9/2001 | Gagnon ................. 340/506 |
| 6,335,871 B1 * | 1/2002 | Kita et al. .............. 363/35 |

OTHER PUBLICATIONS

Generac Power Systems, Inc., "E" Control Panel Bulletin 0161310SBY, Printed in USA,5.99,6.99,9.99.*
Murphy Generator Control Panel MGC90 Series, MGC–00108B Effective 09–00, Catalog Section 75 (00–02–0439).*

(Continued)

Primary Examiner—Gregory J. Toatley, Jr.
(74) Attorney, Agent, or Firm—Karl A. Vick, Esq.; Armstrong Teasdale LLP

(57) ABSTRACT

An automatic transfer switch (ATS) controller is disclosed which includes a power supply circuit to regulate and filter input power, a transformer to convert utility and generator power sources into power supply voltages and voltage sensing sources and a voltage sense signal conditioning circuit. Controller further implements a solenoid driver circuit to drive automatic transfer switch solenoids, an embedded microcontroller configured to monitor utility and generator voltages and a user interface interfaced to said microcontroller for operator entry of instructions. A LED indicator is included and is configured to verify user interface entries and overall operation of the controller and ATS system.

44 Claims, 3 Drawing Sheets

OTHER PUBLICATIONS

Caterpillar Automatic Transfer Switch Engine Division, MX Series Microprocessor Bated ATS Controllers, Oct. 2000.*

Operation and Maintenance Manual Transfer Switch Control Panel. Zenity Controls, Inc. 21 pgs. [online] 5/99. [Retrieved on Nov. 26, 2003]. (Retrieved from the internet <url:http://www.geindustrial.com/products/manuals/50r–1000.pdf>.*

ASCO Series 165 Automatic Transfer Switches. Automataic Switch Co. 8 pages. [online] 1999. [Retrieved on Nov. 26, 2003]. (Retrieved from the internet <url:http://www.asco.com/home.htm>.*

ASCO 165 Series, wiring diraram DS–702704. Automatic Switch Co. 1 page. [online] 1999. [Retrieved on Nov. 26, 2003]. (Retrieved from the internet <url:http://www.asco.com/home.htm>.*

ZTG Series Automatic Transfer Switches. 6 pages. [online] 2/99. [Retrieved on Nov. 26, 2003]. (Retrieved from the internet <url:http://www.statelinepower.com/ztg%20guide.pdf>.*

* cited by examiner

AUTOMATIC TRANSFER SWITCH SYSTEMS AND CONTROLLERS

BACKGROUND OF THE INVENTION

This invention relates generally to electrical switches and, more particularly, to automatic transfer switches and control thereof.

Many businesses use transfer switches for switching power sources, for example, from a public utility source to a private secondary supply, automatically within a matter of seconds. Critical load businesses, such as, for example, hospitals, airport radar towers, and high volume data centers are dependent upon automatic transfer switches to provide continuous power. Transfer switches typically utilize a plurality of contacts that can be open or closed.

Typically, automatic transfer switches are controlled using relay logic, programmable logic controllers (PLCs) or embedded controllers. In known systems, the embedded controller monitors the public utility power source for a fault condition. Upon recognizing any one of a number of faults with the utility power, the embedded controller is configured to switch in the secondary source of power, typically a generator, via the transfer switches.

Known automatic transfer switch controllers incorporate external components to accomplish the control task and require hardware and software redesigns when making input/output (I/O) changes. Further, known automatic transfer switch controllers are unable to communicate with external devices for software selection of options.

Accordingly, it would be desirable to provide systems for automatic transfer switch control which eliminate external components and provide flexibility for I/O circuit redesign. It would be further desirable to have an automatic transfer switch controller with a communications interface to enable and select software options from an external device.

BRIEF SUMMARY OF THE INVENTION

An automatic transfer switch controller includes a power supply circuit to regulate and filter input power. Also included is a transformer to convert utility and generator power sources into power supply voltages and voltage sensing sources for the controller. A voltage sense signal conditioning circuit is included as is a solenoid driver circuit used to drive automatic transfer switch solenoids. The controller uses an embedded microcontroller to monitor utility and generator voltages which is interfaced to a user interface for operator entry of instructions. An LED indicator interfaced to said microcontroller is used to indicate operator entry of instructions at the operator interface.

DETAILED DESCRIPTION OF THE INVENTION

Figure 1:
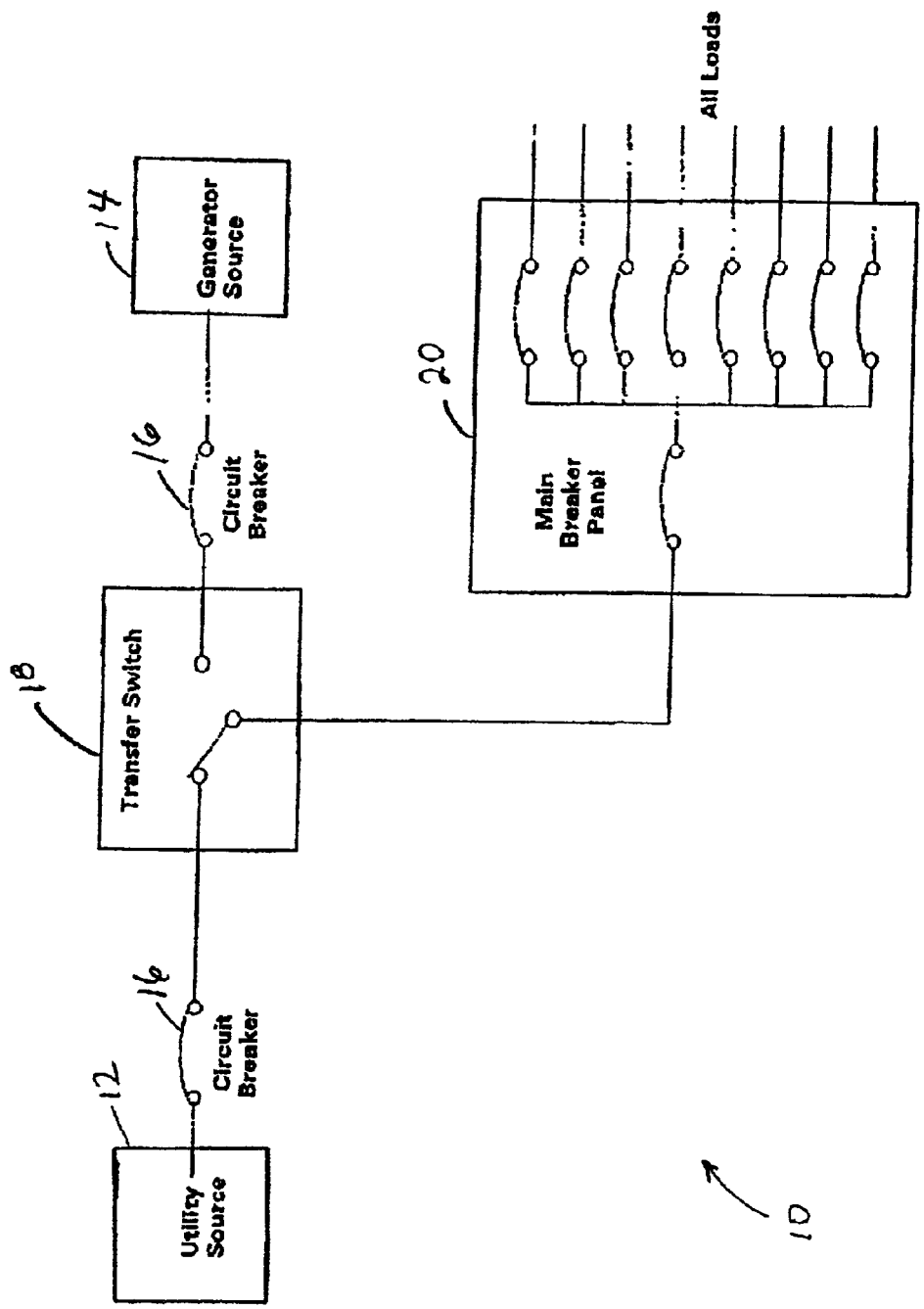
FIG. 1 is a simplified schematic showing electrical routing within an automatic transfer switch system.

FIG. 1 is a simplified schematic diagram 10 showing electrical routing within an automatic transfer switch (ATS) system. Included in diagram 10 are a utility source 12 and a generator source 14. Each of utility source 12 and generator source 14 are routed through circuit breakers 16 to a transfer switch 18. Transfer switch 18 is configured to route electrical power from utility source 12 through transfer switch 18 to a main breaker panel 20, through which electricity is distributed throughout a facility. Transfer switch 18 is further configured with a controller (not shown) to monitor the power from utility source 12 for power quality, for example voltage, power factor, electrical noise and the like. When the transfer switch controller senses a problem with power quality, based upon preset limits, the transfer switch controller commands transfer switch 18 to switch to electrical power from generator source 14, on a temporary basis, until the transfer switch controller senses that the power quality from utility source 12 has returned to an acceptable level.

Figure 2:
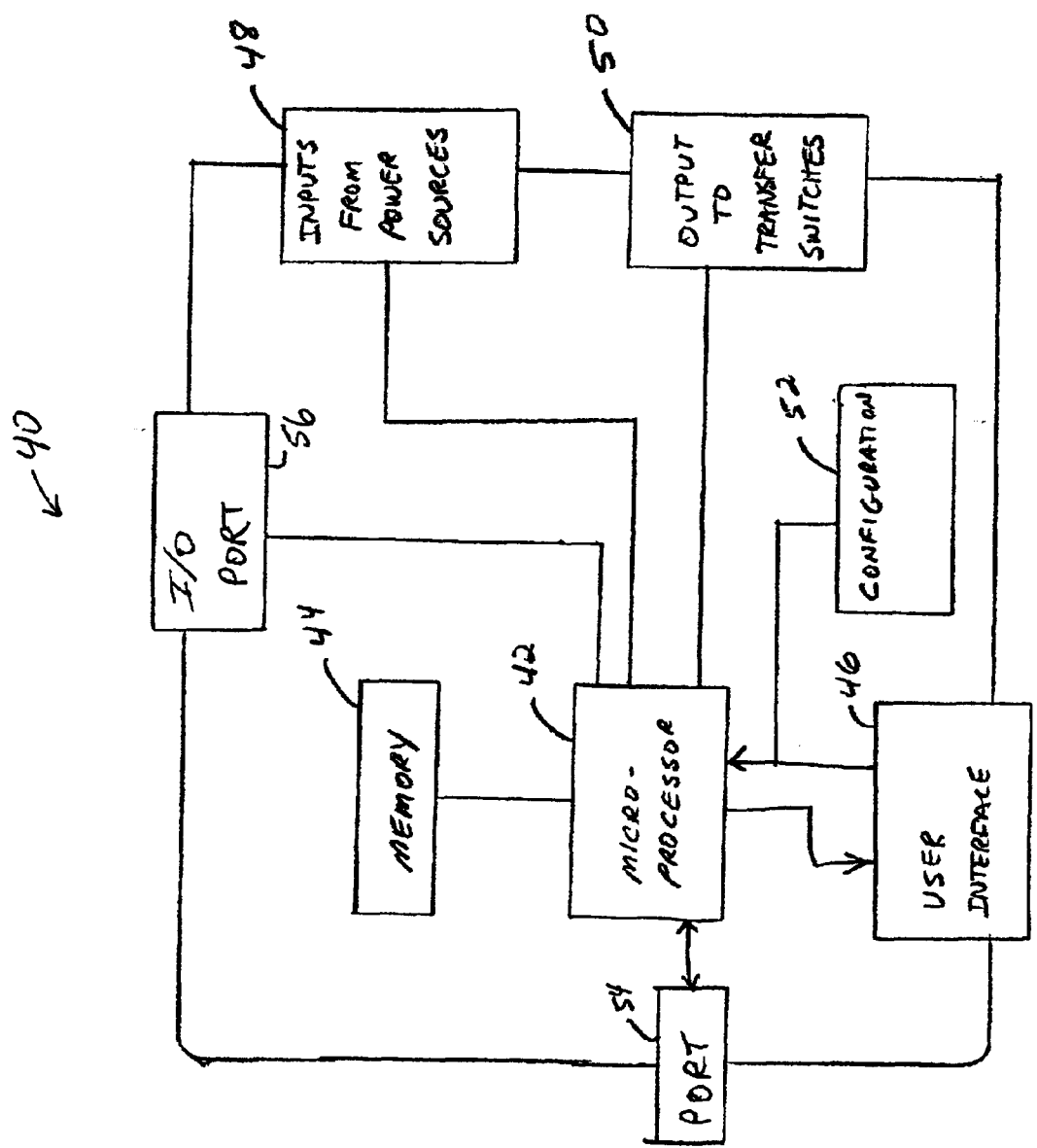
FIG. 2 is a block diagram of an automatic transfer switch controller.

FIG. 2 is a block diagram of an automatic transfer switch controller 40. Controller 40 includes a microcontroller 42, a memory 44, a user interface 46, a power input section 48, an output section 50 which is configured to command one or more transfer switches 18 (shown in FIG. 1) to go to power from a generator source or to return to a utility source of power. Controller 40 also includes a configuration section 52, a communications port 54 and a multi-function input/output (I/O) port 56 described below in more detail.

The term microcontroller, as used herein, also refers to microprocessors, reduced instruction set circuits (RISC), application specific integrated circuits (ASICs), logic circuits, and any other circuit or processor capable of executing the programs described above.

Controller 40 is a low cost, high performance ATS controller with software selectable options. In one exemplary embodiment, software options are to be enabled or disabled through the use of a factory configuration program via port 54, which is for example, an RS232 port.

Controller 40 is configured with external connections (not shown in FIG. 2) to allow for adaptation of multiple function input/output (I/O) boards. I/O boards give controller 40 a modular configuration where different options can be made available to the end user if needed.

In one exemplary embodiment, functions of controller 40 are implemented on a main control circuit board which includes control and conditioning circuits as described below.

Power input section 48 includes transformers to convert power from utility source and generator source 14 (both shown in FIG. 1) into power supply voltages for powering controller 40 and into voltages to be sensed by controller 40. Power input section 48 regulates and filters raw supply voltages from the transformers before it is applied to the main control board of controller 40 and any optional I/O boards such that correct operating voltages and currents are applied to such boards.

Power input section 48 further includes a voltage sense signal conditioning circuit which uses low pass filtering techniques to remove all unwanted noise from the raw voltage supply before it is applied to analog-to-digital converter (ADC) pins on microcontroller 42. Filtering allows controller 40 to correctly sense voltage and frequency when utility source 12 or generator source 14 contain large amounts of harmonic distortion.

In another exemplary embodiment of controller 40, output section 50 is configured as a solenoid driver circuit which includes two options of solenoid drivers, both of which are implemented on the main control board. A first solenoid driver option is configured with on-board relays when the utility and generator power sources are 240Vac and below. A second solenoid driver option is configured with solid state devices when the utility and generator power sources are greater than 240Vac, but less than 600Vac. The solenoid driver circuit is used to control the power supplied to an ATS drive solenoid which causes swithcing from one electrical power source to another in transfer switch 18 (shown in FIG. 1).

Using user interface 46 a user can momentarily energize a normal output causing the ATS to transfer to normal position, the position where utility power is used. Momentarily energizing an emergency output causes the ATS to transfer to the position where generator power is used. In order to protect the ATS drive solenoid from damage, a solenoid saver scheme is implemented in controller 40 which controls the maximum on time and the number of tries a drive solenoid can be energized for before shutting down the drive circuit and initiating a diagnostic mode.

All functions on the main control board are controlled by microcontroller 42 which uses custom written firmware to monitor the utility and generator voltages and frequency, monitor user interface updating indicator LEDs on user interface 46, perform real time clock functions, monitor ATS position and control the ATS. Microcontroller 42 also monitors and controls all external I/O connections used to control any auxiliary I/O boards. In a further embodiment, controller 40 is configured with a generator cool down timer, a generator warmup timer, a loss of power delay timer, a generator fail-to-start timer, a generator crank timer, a generator pause timer, a generator overload timer and an utility stabilization before switchback timer.

Controller 40 includes a configuration section 52. In one embodiment, configuration section 52 includes a jumper panel. Jumpers are installed by a user to select one of a seven, 14, 21, or 28 day cycle for a built in ATS exerciser. The exerciser period can be adjusted for seven, 14, 21, or 28 days by selecting the appropriate jumpers setting located on the main control board.

Configuration section 52 further includes jumper selectable voltage and frequency selections. The voltage controller 40 can sense is selectable from 120, 208, 220, and 240 Vac through the use of the correct jumper settings. Voltage ranges in the 380, 415, 440, and 480Vac are also selectable, but require that a different transformer be used in controller 40. Jumpers are also available for frequency selections of 50 Hz and 60 Hz.

Controller 40 is further configured with a passive load shed option which, when coupled with a load shed I/O option board will disconnect certain high kilowatt loads before the controller transfers loads from utility power to generator power, thereby preventing unwanted loads from over loading generator 14.

In another embodiment, controller 40 is configurable with a generator control board (not shown) option which is an optional I/O board that connects to the main control board and contains I/O functions which are accessible at I/O port 56. Examples of I/O functions include, but are not limited to oil pressure sensing, temperature sensing, and a set of dry contacts for starter motor control including a fuel/run contact output and a start contact output. When a generator control board is included in controller 40, a software control bit is enabled to allow access to the board I/O functions.

In still another embodiment, controller 40 is configurable with a three phase sense board (not shown). The three-phase sense board is an optional I/O board that expands controller 40 from single-phase voltage sensing to three-phase voltage sensing on both utility and generator power sources. The three-phase sense board contains all of the necessary conditioning circuitry necessary for proper voltage and frequency detection.

Figure 3:
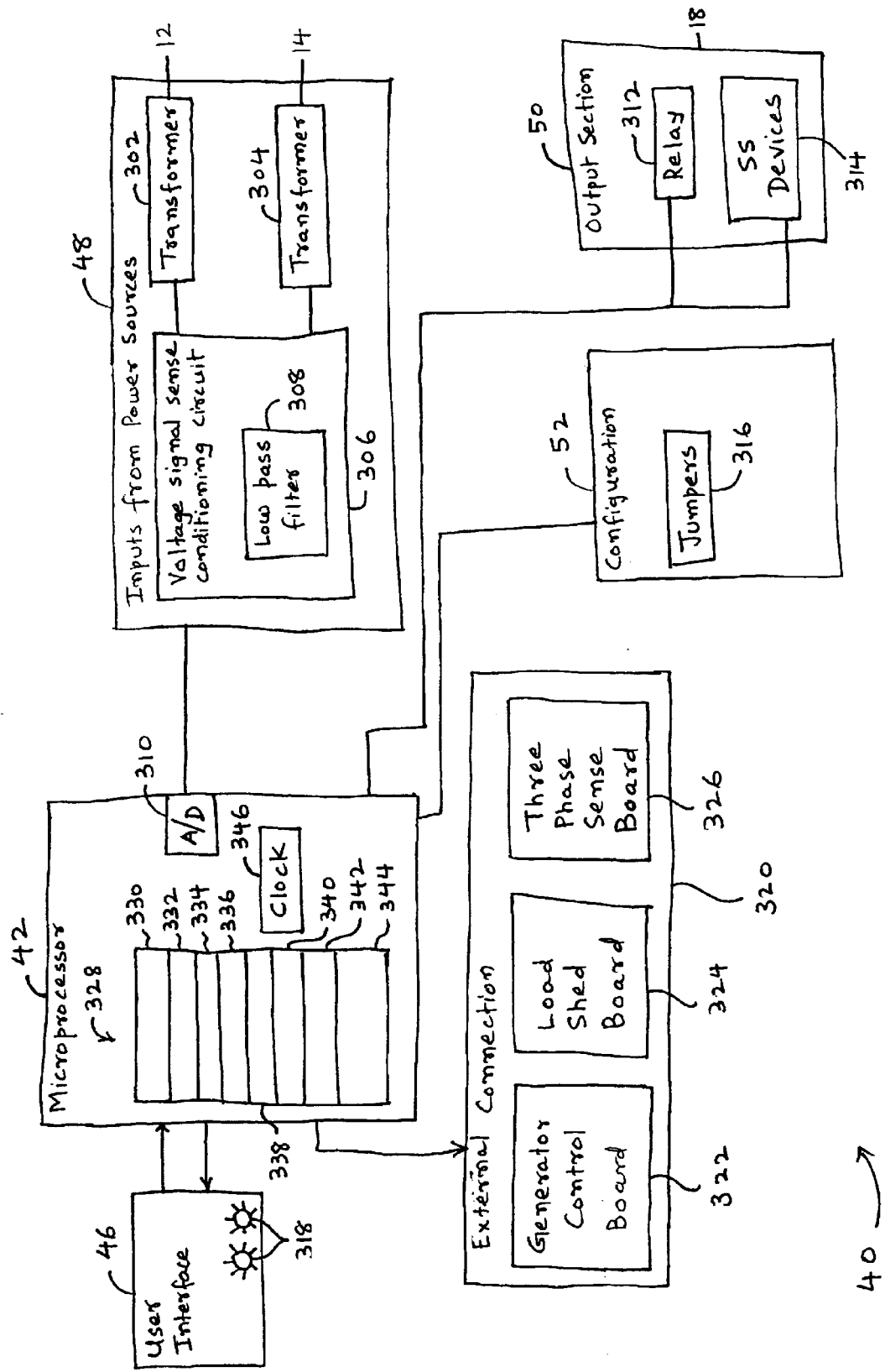
FIG. 3 is a detailed block diagram of a portion of the automatic transfer switch controller shown in FIG. 2.

FIG. 3 is a detailed block diagram of a portion of the automatic transfer switch controller 40 shown in FIG. 2. Components of automatic transfer switch controller shown in FIG. 3 that are identical to components shown in FIG. 2 are numbered in FIG. 3 with similar reference numerals as were used in FIG. 2. Accordingly, automatic transfer switch controller includes power input section 48 that includes transformers 302 and 304 electrically coupled to utility source 12 and generator source 14, respectively. Transformers 302 and 304 are electrically coupled to a voltage sense signal conditioning circuit 306 that includes a low pass filter 308. The output of voltage sense signal conditioning circuit 306 is communicatively coupled to an analog-to-digital converter (A/D) input 310 of microprocessor 42. In an alternative embodiment, A/D 310 may be a stand alone device mounted to controller 40.

Controller 40 also includes output section 50. In one embodiment, output section 50 includes relay solenoid driver devices 312 coupled to microprocessor 42. In an alternative embodiment, output section 50 includes solid state solenoid driver devices 314 coupled to microprocessor 42.

Configuration section 52 includes a plurality of user selectable jumpers 316 to facilitate controlling the operation of controller 40. User interface 46 includes at least one LED 318 to provide visual indication of, for example, user interface update status.

A plurality of modular I/O boards may be coupled to microprocessor 42 through external connection 320. The plurality of I/O boards may include a generator control board 322, a load shed board 324, and a three phase sense board 326.

Microprocessor 42 includes a plurality of timers 328 that facilitate controlling the operation of controller 40. Timers 328 may include, for example, a generator cool down timer 330, a generator warm-up timer 332, a loss of power delay timer 334, a generator fail-to-start timer 336, a generator crank timer 338, a generator pause timer 340, a generator overload timer 342 and an utility stabilization before switchback timer 344. Microprocessor 42 also includes an exercise clock. Timers 328 and clock 346 may be imbedded in a software segment running on microprocessor 42 and/or occupy registers in microprocessor 42.

Controller 40 solves problems present in known controllers. Such problems include external relay transformer boxes separate form the controller, a need for an external exerciser clock and the ability to make I/O changes without complete redesign of the ATS controller. In addition, controller 40 locates all ATS control components and voltage conditioning components on a main control board, thereby allowing for other I/O functionality to be implemented on option boards as described above.

While the invention has been described in terms of various specific embodiments, those skilled in the art will recognize that the invention can be practiced with modification within the spirit and scope of the claims.

What is claimed is:

1. An automatic transfer switch controller comprising:
   at least one transformer to convert power from utility and generator power sources into power supply voltages for powering said controller and into voltages to be sensed by said controller;

a power supply circuit to regulate and filter signals from said transformer;

a solenoid driver circuit to drive automatic transfer switch solenoids that are configured to facilitate a supply of power from one of said utility and generator power sources;

an embedded microcontroller configured to control logic functions and to monitor voltages from said utility and generator power sources;

a voltage sense signal conditioning circuit for filtering signals provided to said microcontroller, wherein at least two of said microcontroller, solenoid driver circuit and voltage sense signal conditioning circuit are located on a control circuit board;

a user interface operationally coupled to said microcontroller for operator entry of instructions; and at least one LED indicator interfaced to said microcontroller to indicate operator entry of instructions at said user interface.

2. A controller according to claim 1 wherein said microcontroller comprises at least one analog-to-digital converter.

3. A controller according to claim 2 wherein said voltage sense signal conditioning circuit comprises low pass filters configured to remove noise from the power supply voltages thereby enabling said microcontroller analog-to-digital converter to correctly sense voltage and frequency.

4. A controller according to claim 1 wherein said solenoid driver circuit is configured with relays for powering automatic transfer switch drive solenoids.

5. A controller according to claim 1 wherein said solenoid driver circuit is configured with solid state devices for powering automatic transfer switch drive solenoids.

6. A controller according to claim 1 wherein said microcontroller is configured to recognize jumper selections for an exerciser clock adjustable for settings for a preselected number of days.

7. A controller according to claim 1 wherein said microcontroller is configured to recognize jumper selections for supply voltages for at least one of 120 VAC, 208 VAC, 220 VAC and 240 VAC.

8. A controller according to claim 1 wherein said transformer is configured for supply voltages of at least one of 380 VAC, 415 VAC, 440 VAC and 480 VAC, said microcontroller is configured to recognize jumper selections for supply voltages for at least one of 380 VAC, 415 VAC, 440 VAC and 480 VAC.

9. A controller according to claim 1 further comprising a generator control board configured to interface with said microcontroller and to sense at least one of oil pressure and temperature.

10. A controller according to claim 9 wherein said generator control board is configured with a set of dry contact outputs for starter motor control including at least one of a fuel/run contact output and a start contact output.

11. A controller according to claim 1 further comprising a three phase sense board configured to expand single phase sensing capabilities of said controller to three phase sensing on utility and generator sources.

12. A controller according to claim 1 further comprising a load shed I/O option board configured to disconnect loads before said controller transfers loads to a generator power source, preventing generator over load.

13. A controller according to claim 1 wherein said microcontroller is configured with at least one of a generator cool down timer, a generator warmup timer, a loss of power delay timer, a generator fail-to-start timer, a generator crank timer, a generator pause timer, a generator overload timer and an utility stabilization before switchback timer.

14. A controller according to claim 1 wherein said microcontroller is configured to recognize jumper selections for frequencies of 50 Hz and 60 Hz.

15. An automatic transfer switch system comprising:
an input configured to be connected to a utility power source;
an input configured to be connected to a generator power source;
a transfer switch configured to switch a load from said utility power source to said generator power source and further configured to switch the load back to said utility power source; and
an automatic transfer switch controller comprising:
at least one transformer to convert power from utility and generator power sources into power supply voltages for powering said controller and into voltages to be sensed by said controller,
a power supply circuit to regulate and filter signals from said transformer;
a solenoid driver circuit to drive automatic transfer switch solenoids that are configured to facilitate a supply of power from one of said utility and generator power sources;
an embedded microcontroller configured to control logic functions and to monitor voltages from said utility and generator power sources;
a voltage sense signal conditioning circuit for filtering signals provided to said microcontroller, wherein at least two of said microcontroller, solenoid driver circuit and voltage sense signal conditioning circuit are located on a control circuit board;
a user interface operationally coupled to said microcontroller for operator entry of instructions; and
at least one LED indicator interfaced to said microcontroller to indicate operator entry of instructions at said user interface.

16. An automatic transfer switch system according to claim 15 wherein said microcontroller further comprises at least one analog-to-digital converter.

17. An automatic transfer switch system according to claim 16 wherein said voltage sense signal conditioning circuit comprises low pass filters configured to remove noise from the power supply voltages thereby enabling said microcontroller analog-to-digital converter to correctly sense voltage and frequency.

18. An automatic transfer switch system according to claim 15 wherein said solenoid driver circuit is configured with relays for powering automatic transfer switch drive solenoids.

19. An automatic transfer switch system according to claim 15 wherein said solenoid driver circuit is configured with solid state devices for powering automatic transfer switch drive solenoids.

20. An automatic transfer switch system according to claim 15 wherein said microcontroller is configured to recognize jumper selections for an exerciser clock adjustable for a preset number of days.

21. An automatic transfer switch system according to claim 15 wherein said microcontroller is configured to recognize jumper selections for supply voltages for at least one of 120 VAC, 208 VAC, 220 VAC and 240 VAC.

22. An automatic transfer switch system according to claim 15 wherein said transformer is configured for supply voltages of at least one of 380 VAC, 415 VAC, 440 VAC and 480 VAC, said microcontroller is configured to recognize jumper selections for supply voltages for at least one of 380 VAC, 415 VAC, 440 VAC and 480 VAC.

23. An automatic transfer switch system according to claim 15 wherein said controller further comprises a generator control board configured to interface with said microcontroller and to sense at least one of oil pressure and temperature.

24. An automatic transfer switch system according to claim 23 wherein said generator control board is configured with a set of dry contact outputs for starter motor control including at least one of a fuel/run contact output and a start contact output.

25. An automatic transfer switch system according to claim 15 wherein said controller further comprises a three phase sense board configured to expand single phase sensing capabilities of said controller to three phase sensing on utility and generator sources.

26. An automatic transfer switch system according to claim 15 wherein said controller further comprises a load shed I/O option board configured to disconnect loads before said controller transfers loads to a generator power source, preventing generator over load.

27. An automatic transfer switch system according to claim 15 wherein said microcontroller is configured with at least one of a generator cool down timer, a generator warmup timer, a loss of power delay timer, a generator fail-to-start timer, a generator crank timer, a generator pause timer, a generator overload timer and an utility stabilization before switchback timer.

28. An automatic transfer switch system according to claim 15 wherein said microcontroller is configured to recognize jumper selections for frequencies of 50 Hz and 60 Hz.

29. An automatic transfer switch controller configured to control an automatic transfer switch that switches between providing power from a utility power source and from an alternate power source, said controller comprising a configuration section including a jumper panel that is built within said controller and that is configured to select a cycle for a clock.

30. A controller in accordance with claim 29 wherein said clock is an exercise clock located within said controller.

31. A controller in accordance with claim 29 wherein the cycle is one of a 7 day, a 14 day, a 21 day, and a 28 day cycle.

32. A controller in accordance with claim 29 wherein said controller comprises a microcontroller and said configuration section is used to configure said microcontroller by selecting at least one of a voltage and a frequency provided to said microcontroller.

33. A controller in accordance with claim 32 wherein the voltage is one of 120 volts, 208 volts, 220 volts, and 240 volts.

34. A controller in accordance with claim 32 wherein the voltage is one of 380 volts, 415 volts, 440 volts, and 480 volts.

35. A controller in accordance with claim 32 wherein the frequency is one of 50 hertz and 60 hertz.

36. A controller in accordance with claim 32 further comprising:
    jumpers installed to select one of the voltage and frequency provided to said microcontroller.

37. An automatic transfer switch controller comprising at least one phase sense board configured to expand a capability of said controller from single phase voltage sensing to multiple phase voltage sensing of voltages generated from one of a utility and an alternate power source.

38. A controller in accordance with claim 37 wherein the multiple phase sensing includes sensing three phase voltages.

39. A controller in accordance with claim 37 further comprising a microcontroller configured to monitor voltages and frequencies of said utility and alternate power sources.

40. A controller in accordance with claim 39 wherein said microcontroller is located on a main control circuit board and said phase sense board is an option board.

41. An automatic transfer switch controller comprising jumpers that are located on a main control board on which a microprocessor is located and that are configured to receive jumper selections of frequencies and voltage levels sensed by said controller.

42. A controller in accordance with claim 41 wherein the jumper selections include a selection for a cycle of a clock within said controller.

43. A controller in accordance with claim 29 wherein said controller is configured to be coupled to an option board that disconnects at least one load before said controller transfers at least one of a plurality of loads from said utility power source to said alternate power source.

44. A controller in accordance with claim 41 further comprising a generator control board separate from said main control board, coupled to said main control board, and configured to sense functions of an alternate source that provides power to a load via an automatic transfer switch controlled by said controller, wherein the functions of said generator control board are accessed by said controller when a control bit is enabled.

* * * * *